(12) United States Patent
Polak

(10) Patent No.: US 7,768,605 B2
(45) Date of Patent: Aug. 3, 2010

(54) DISPLAY STACK-UP FOR A MOBILE ELECTRONIC DEVICE HAVING INTERNAL AND EXTERNAL DISPLAYS

(75) Inventor: Robert D. Polak, Lindenhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 849 days.

(21) Appl. No.: 11/427,871

(22) Filed: Jun. 30, 2006

(65) Prior Publication Data

US 2008/0002115 A1     Jan. 3, 2008

(51) Int. Cl.
  *G02F 1/1335*  (2006.01)
  *G02F 1/1347*  (2006.01)

(52) U.S. Cl. ............. 349/114; 349/63; 349/74; 313/583; 313/587; 708/130

(58) Field of Classification Search ......... 349/114, 349/63, 74; 313/586, 587; 708/130
See application file for complete search history.

(56) References Cited

U.S. PATENT DOCUMENTS

| | | | |
|---|---|---|---|
| 5,896,575 A | 4/1999 | Higginbotham et al. | |
| 6,439,731 B1 | 8/2002 | Johnson et al. | |
| 6,574,487 B1 | 6/2003 | Smith et al. | |
| 6,667,731 B2 * | 12/2003 | Park | 345/102 |
| 6,927,747 B2 | 8/2005 | Amirzadeh et al. | |
| 7,226,200 B2 * | 6/2007 | Tsai | 362/616 |
| 2002/0051181 A1 * | 5/2002 | Nishimura | 358/1.15 |
| 2002/0163529 A1 | 11/2002 | Evanicky | |
| 2004/0189902 A1 | 9/2004 | Kim et al. | |
| 2005/0001797 A1 | 1/2005 | Miller, IV et al. | |
| 2005/0024319 A1 * | 2/2005 | Amirzadeh et al. | 345/104 |
| 2005/0113145 A1 * | 5/2005 | Chon | 455/566 |
| 2005/0243069 A1 | 11/2005 | Yorio et al. | |
| 2005/0264471 A1 * | 12/2005 | Yamazaki et al. | 345/1.1 |
| 2006/0038938 A1 * | 2/2006 | Nakano et al. | 349/110 |
| 2006/0097955 A1 | 5/2006 | Kato | |

FOREIGN PATENT DOCUMENTS

JP   2000180847     6/2000
JP   2000180847 A   6/2000

OTHER PUBLICATIONS

Patent Cooperation Treaty; "Notification of Transmittal of the International Search Report and the Written Opinion of the International Search Authority, or the Declaration"; International Application No. PCT/US07/64867; International Filing date Mar. 24, 2007; Date of Mailing Feb. 15, 2008; 7 pages.

* cited by examiner

*Primary Examiner*—Julie-Huyen L Ngo
(74) *Attorney, Agent, or Firm*—Hisashi D. Watanabe

(57) ABSTRACT

A display stack-up (300) is provided for a mobile electronic device (100) having an internal and external display, for example, a clamshell style mobile phone. The display stack-up comprises a backlight unit (114) and an external display device (110) having bi-stable optical states. The external display device (110) is placed in contact with, and is optically coupled to, the backlight unit (114). The display stack-up further comprises an internal display device (106) which is placed in contact with, and is optically coupled to, the external display device (110).

16 Claims, 4 Drawing Sheets

DISPLAY STACK-UP FOR A MOBILE ELECTRONIC DEVICE HAVING INTERNAL AND EXTERNAL DISPLAYS

FIELD OF THE DISCLOSURE

The present disclosure relates in general to mobile electronic devices and more specifically to display stack-up configurations in mobile electronic devices having dual displays such as internal and external displays.

BACKGROUND

Most clamshell style mobile electronic devices used today employ two displays. The two displays include an external display and an internal display. The external display usually has lower visual information content than the internal display and is sometimes referred to as a Caller Line Identification (CLI) display when used in for example mobile phones. The two displays are usually employed in a stacked configuration where the displays are stacked back to back. The stack-up requires a backlight to illuminate the displays.

In some configurations, two backlight units may be sandwiched between the internal display and the external display. In such configurations, each of the two back light units provides the necessary light for one display. In other configurations, a single backlight unit may be sandwiched between the two displays. In yet another configuration, a single two sided display may be sandwiched between two backlight units.

The configurations for display stack-ups, described above, are quite thick. The external display is smaller than the internal display, therefore the external display has a smaller active area. Moreover, in all of the configurations mentioned above, the power required for the backlight units is considerable.

BRIEF DESCRIPTION OF DRAWINGS

The accompanying figures, where like reference numerals refer to identical or functionally similar elements throughout the separate views, and which, together with the detailed description below, are incorporated in and form part of the specification, serve to further illustrate various embodiments and to explain various principles and advantages, all in accordance with the various embodiments herein disclosed.

Skilled artisans will appreciate that elements in the figures are illustrated for simplicity and clarity and have not necessarily been drawn to scale. For example, the dimensions of some of the elements in the figures may be exaggerated relative to other elements to help in improving the understanding of the various embodiments.

Further, the figures are for exemplary and illustrative purposes only and are not intended to be complete schematic representations of all elements and/or components necessary to implement any of the various embodiments as such non-represented elements and/or components are readily understood by one skilled in the art.

DETAILED DESCRIPTION

The various embodiments herein disclosed provide a display stack-up comprising an external display device, and internal display device and a backlight. In the various embodiments the external display device comprises bi-stable optical states. The optical states of the external display device include a transmissive optical state and a reflective optical state. The external display device is placed in contact, and thus is optically coupled, with the backlight unit. The display stack-up also comprises an internal display device which is placed in contact, and thus optically coupled, with the external display device.

Further, in the various embodiments, a mobile electronic device comprising an internal display device, an external display device with bi-stable optical states and a backlight may further comprise a control component, which is coupled to the internal display device, the external display device and the backlight.

The various embodiments also provide a method of operation of a mobile electronic device employing the display as disclosed herein. The method comprises switching an external display device to a reflective optical state and supplying light to an external display device from a backlight. The method further comprises reflecting the light supplied to the external display device from the backlight. Moreover, the method includes switching the external display device to a transmissive optical state which in turn transmits light from the backlight to the internal display device.

It is to be understood that relational terms as used herein, such as, but not limited to, "first" and "second," and the like, may be used solely to distinguish one entity or action, from another entity or action without necessarily requiring or implying any actual such relationship or order between such entities or actions.

Figure 1:
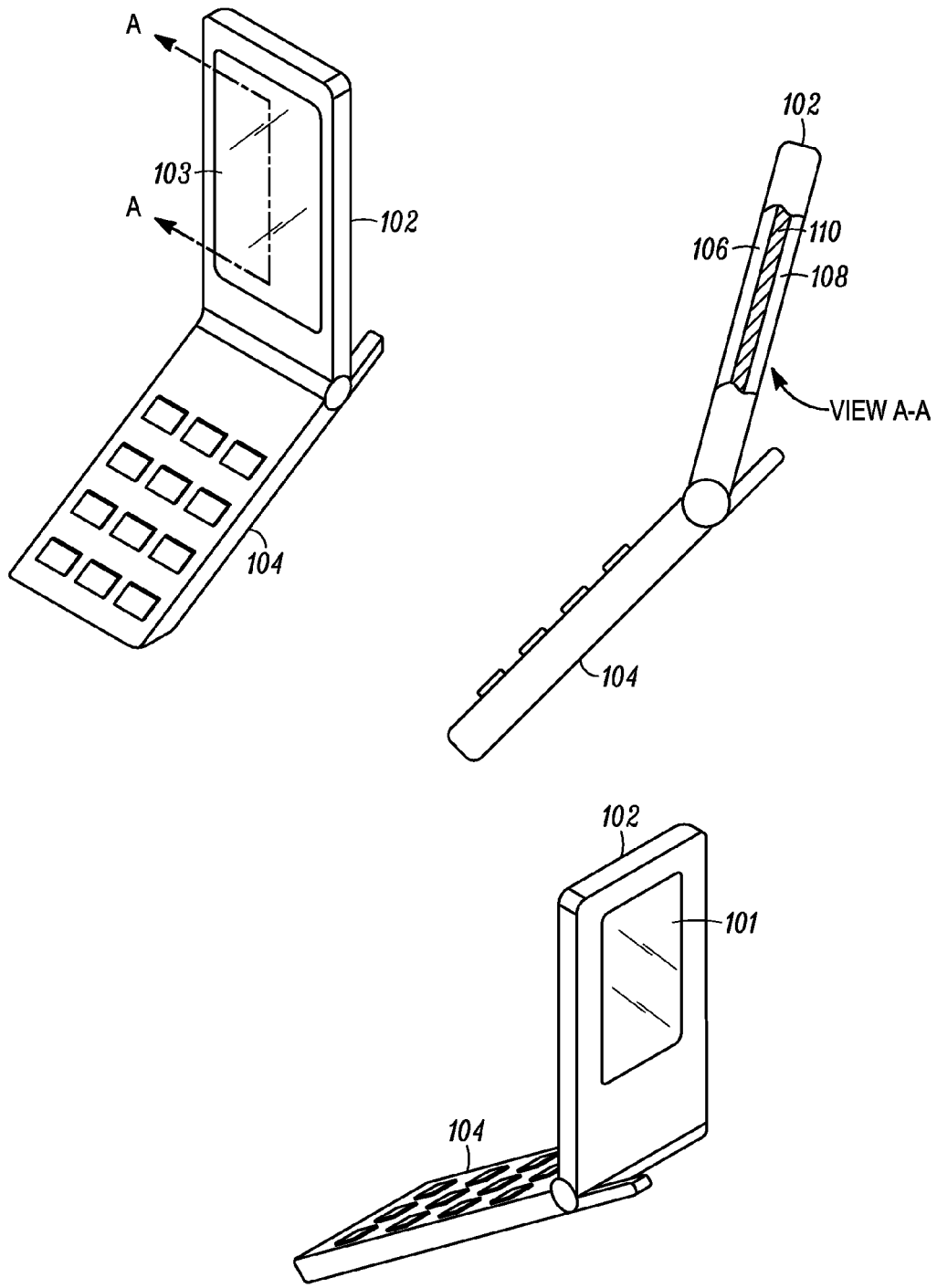
FIG. 1 illustrates a cross-sectional view of a clamshell style mobile electronic device in an open position and having a display in accordance with the various embodiments.

FIG. 1 illustrates a mobile electronic device 100 in an open position and having a display in accordance with the various embodiments. Examples of a mobile electronic device 100 in accordance with the various embodiments include a wireless mobile telephone, a Laptop, a Personal Digital Assistant (PDA), and the like. It will be apparent to those skilled in the art that the mobile electronic device 100 may have dimensions and shapes different than those shown in the figure.

The mobile electronic device 100 includes a first housing member 102 and a second housing member 104. The first housing member 102 and the second housing member 104 may be made up of materials like metal, plastic, glass and/or hybrids thereof. The first housing member 102 and the second housing member 104 are hingedly connected with one another and are configurable in the open and closed positions. In other words, the first housing member 102 and the second housing member 104 are connected to each other with a hinge such that the angle between the two is approximately 180° or less, when configured in an open position, and the minimum angle is approximately 0° or slightly greater, when configured in the closed position.

The first housing member 102 further comprises an external display aperture 101 and an internal display aperture 103 through which the external display device 110 and internal display device 106 are viewable, respectively.

The display itself comprises three primary devices which are encased by the first housing member 102. In the cross sectional view of FIG. 1, the three devices are shown in a "stack-up" configuration having the internal display device 106, the external display device 110, and a backlight device 108. The backlight device 108 may, in some embodiments, be physically exposed through the external display aperture 101 of the first housing member 102 or in other embodiments may be viewable through a coating layer or other protective layer over the external display aperture 101 comprising first housing member 102.

Likewise, the internal display aperture 103 may provide a protective plastic layer or coating over the surface of the internal display device 106 in some embodiments or in other embodiments the internal display device 106 may be directly exposed through the internal display aperture 103. It is to be understood that FIG. 1 and FIG. 2 are for illustrative purposes only and for facilitating understanding of the display stack-up configuration of the various embodiments and are not intended to be exhaustive with respect to specific implementation approaches that may be employed for the various embodiments.

Figure 2:
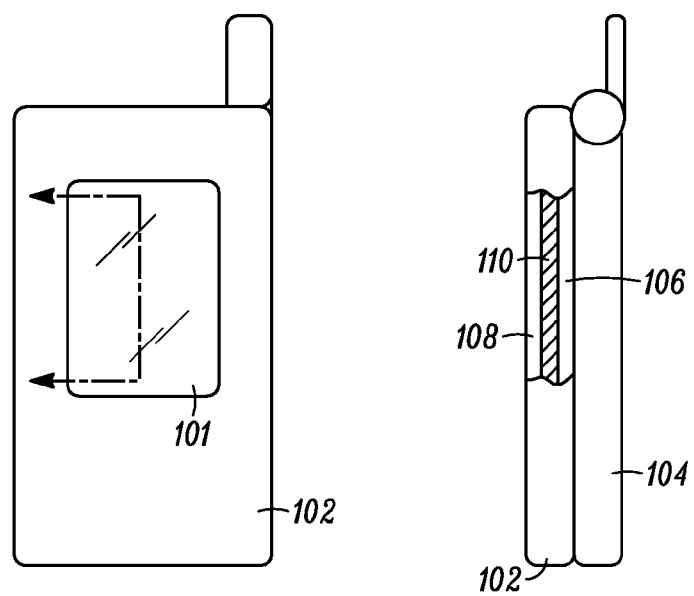
FIG. 2 illustrates the mobile electronic device of FIG. 1 in a closed position.

In the closed position, as illustrated in FIG. 2, the first housing member 102 and the second housing member 104 are configured in such a way that the internal display device 106 is relatively parallel with the second housing member 104. Further, in the closed position, at least a portion of the first housing member 102 is in contact with the second housing member 104 as illustrated by FIG. 2.

In the open position as illustrated in FIG. 1, the first housing member 102 and the second housing member 104 are configured in such a way that no portion of first housing member 102 is in contact with the second housing member 104, except at the portions connected by the hinge, and the internal display device 106 is viewable through the internal display aperture 103. The internal display device 106 is used to display visual information when the first housing member 102 and the second housing member 104 are configured in the open position as illustrated in FIG. 1. The visual information may be text, video, graphics, images, and the like.

The external display device 110 is used to display visual information when the first housing member 102 and the second housing member 104 are configured in the closed position as illustrated in FIG. 2. The information displayed on the external display may only be a subset of the information displayed on the internal display. In other words, the visual content displayed on the external display device 110 is less than the visual content displayed on the internal display device 106.

When the mobile electronic device 100 is in operation, that is, when it is powered on, the external display 110 will be activated, and placed into an appropriate optical state, when the device is configured in the closed position as illustrated by FIG. 2 and the internal display device 106 will be inactivated. When the mobile electronic device 100 is in the open position as illustrated by FIG. 1, the external display device 110 will be generally inactive in terms of power consumption, but placed into an appropriate optical state, while the internal display device 106 will be active.

Switching between the external and internal display, and further switching the external display device 110 into appropriate optical states, may be accomplished in various ways such as sensing the position of the first housing member 102 relative to the second housing member 103. Such position sensing may be via a physical sensor or switch located on the either the first housing member 102 or second housing member 104 such that the physical sensor or switch is activated when the mobile electronic device 100 is configured in the closed position. Alternatively, a sensor or switch may be internal to one of the housing members to determine whether the mobile electronic device 100 is in the open or closed positions. Further, the sensor or switch need not be a physical sensor or switch but may be an electronic device that changes states based upon change in the housing member positions. In any case, some sensing and control circuitry is present in any of the various embodiments such that the position of the first housing member 102 with respect to the second housing member 104 may be determined so as to further determine when to activate and deactivate the internal display device 106 and the external display device 110 relative to the open and closed positions.

Further, the sensing and control circuitry determines when to switch, and indeed switches, the external display device 110 into the appropriate optical state depending on whether the mobile electronic device 100 is in the open or closed configuration. Switching of the optical states of external display device 110 is described in further detail herein.

Figure 3:
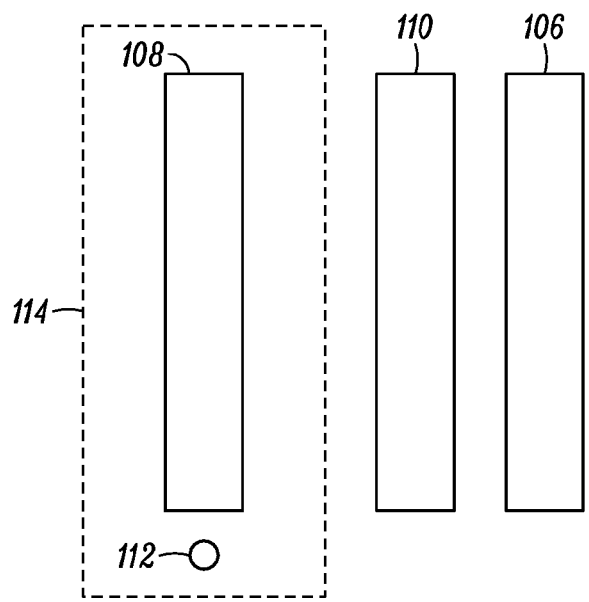
FIG. 3 is a block diagram illustrating a display in accordance with various embodiments.

FIG. 3 is a block diagram illustrating further details of the display stack-up shown in the cross-sectional views of FIG. 1 and FIG. 2. As discussed above with respect to FIG. 1 and FIG. 2, the display stack-up 300 is enclosed in the first housing member 102 of the mobile electronic device 100, and comprises a backlight device 108, an external display device 110 and an internal display device 106, all of which are optically coupled. The backlight device 108 further comprises a light source 112, which together form an overall backlight unit 114. In the various embodiments, the backlight unit 114 will, in general, emit light such that the majority of light emission is at approximately 30° with respect to the backlight unit 114 normal. This emission pattern provides better brightness for the internal display device 106 and also helps reduce energy consumption of the mobile electronic device 100.

The external display device 110 is sandwiched between the backlight 108 and the internal display device 106. The backlight 108 is transparent and highly optically transmissive. In the various embodiments, the backlight 108 enables the transmission of light from the light source 112 to the external display device 110.

Further in the various embodiments, the external display device 110 is at least optically bi-stable, such that the external display device 110 is optically stable in at least two states and may be switched there-between. Thus, in the various embodiments, the external display device 110 has at least a transmissive and a reflective optical state.

In the transmissive optical state, the external display device 110 allows light to transmit through it such that the external display device 110 is essentially transparent. In some embodiments the transmissive optical state may be, for example, a focal conic state of a cholesteric display device. In the reflective optical state, the external display device 110 prevents transmission of light and is essentially mirror like. Likewise, in some embodiments the reflective optical state may be, for example, a planar state of a cholesteric display device. Further in some embodiments, the external display device 110 may be optically diffusing while in the transmissive or focal conic state and thus suppress over-whitish display characteristics for better visual clarity.

The external display device 110 requires either application of power, or removal of power, to switch between the transmissive optical state and the reflective optical state. The power is normally supplied by a battery in the mobile electronic device 102 but may also be provided by a battery charging device or a solar cell in some embodiments.

The internal display device 106 is high resolution and may be, for example, a high-resolution color active matrix display.

The active matrix displays are made of a thin film of transistors or a thin film of diodes and provide a bright and sharp display. Further, in some embodiments the internal display device 106 may also have a bi-stable optical property similar to the external display device 110, or otherwise have a fixed color optical state, such that when the internal display 106 is OFF, it provides a contrast background to the external display device 110 as will be discussed in further detail below.

Figure 4:
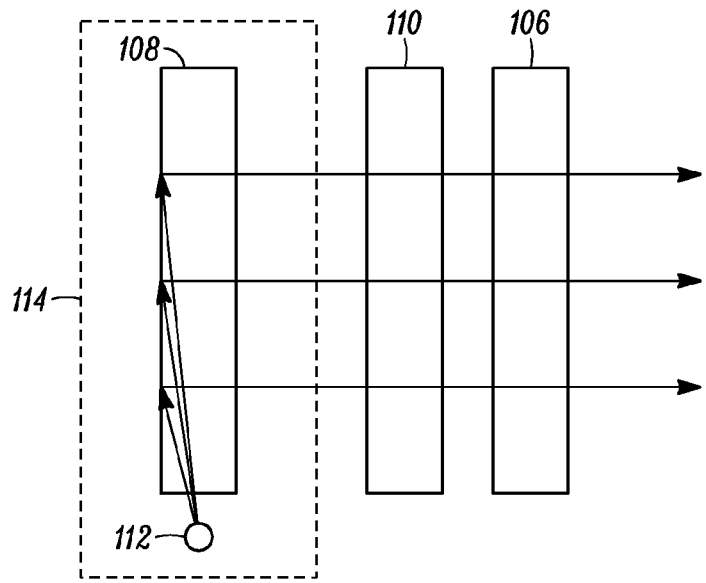
FIG. 4 illustrates a transmissive optical state of an external display device, in accordance with various embodiments.

FIG. 4 illustrates operation of the display stack-up 300 when the external display device 110 is in a transmissive optical state 400, in accordance with the various embodiments. As described above, a sensing and control circuitry (not shown) of the mobile electronic device 100 determines that the mobile electronic device 100 is configured in the open position. The sensing and control circuitry thus switches the external display device 110 into its transmissive optical state, switches the internal display device 106 to an ON state and switches the external display device 110 to an OFF state. Light from the light source 112 is then transmitted through the backlight device 108 and to the internal display device 106 through the external display device 110.

Figure 5:
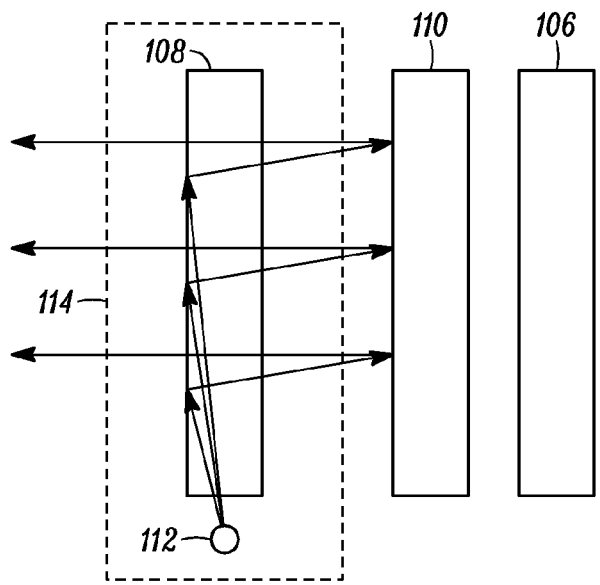
FIG. 5 illustrates a reflective optical state of an external display device in accordance with various embodiments.

FIG. 5 illustrates operation of the display stack-up 300 when the external display device 110 is in a reflective optical state 500, in accordance with the various embodiments. The sensing and control circuitry (not shown) of the mobile electronic device 100 determines that the mobile electronic device 100 is configured in the closed position. The sensing and control circuitry thus switches the external display device 110 into its reflective optical state, switches the internal display device 106 to an OFF state and switches the external display device 110 to an ON state. Light from the light source 112 is then transmitted through the backlight device 108 and illuminates the external display device 110 which reflects the light back through the backlight device 108 and thus through the mobile electronic device 100 external display aperture 101. The external display device 110 is thus viewable.

As was discussed briefly above, in some embodiments, the internal display device 106 may have a bi-stable optical property similar to the external display device 110, or otherwise have a fixed color optical state, such that when the internal display 106 is OFF, it provides a contrast background to the external display device 110. Thus for example, the internal display device 106 may be a normally black mode liquid crystal display (NB-LCD) in some embodiments such that it is dark and absorbs most incident light when in the OFF state, thereby enhancing the contrast ratio of the external display device 110 when the external display device 110 is in its reflective state 500.

Some embodiments also include a light sensor and control circuitry for sensing ambient light conditions. Thus, if there is sufficient ambient light as determined by a measurement exceeding a predetermined luminescence threshold, the light source 112 of the backlight unit 114 may be turned off when the mobile electronic device 100 is closed and thus the external display device 110 is ON and also in the reflective state 500. The external display device 110 will then receive ambient light through the transmissive backlight device 108 and reflect the ambient light back through the external display aperture 101 for external display viewability.

Figure 6:
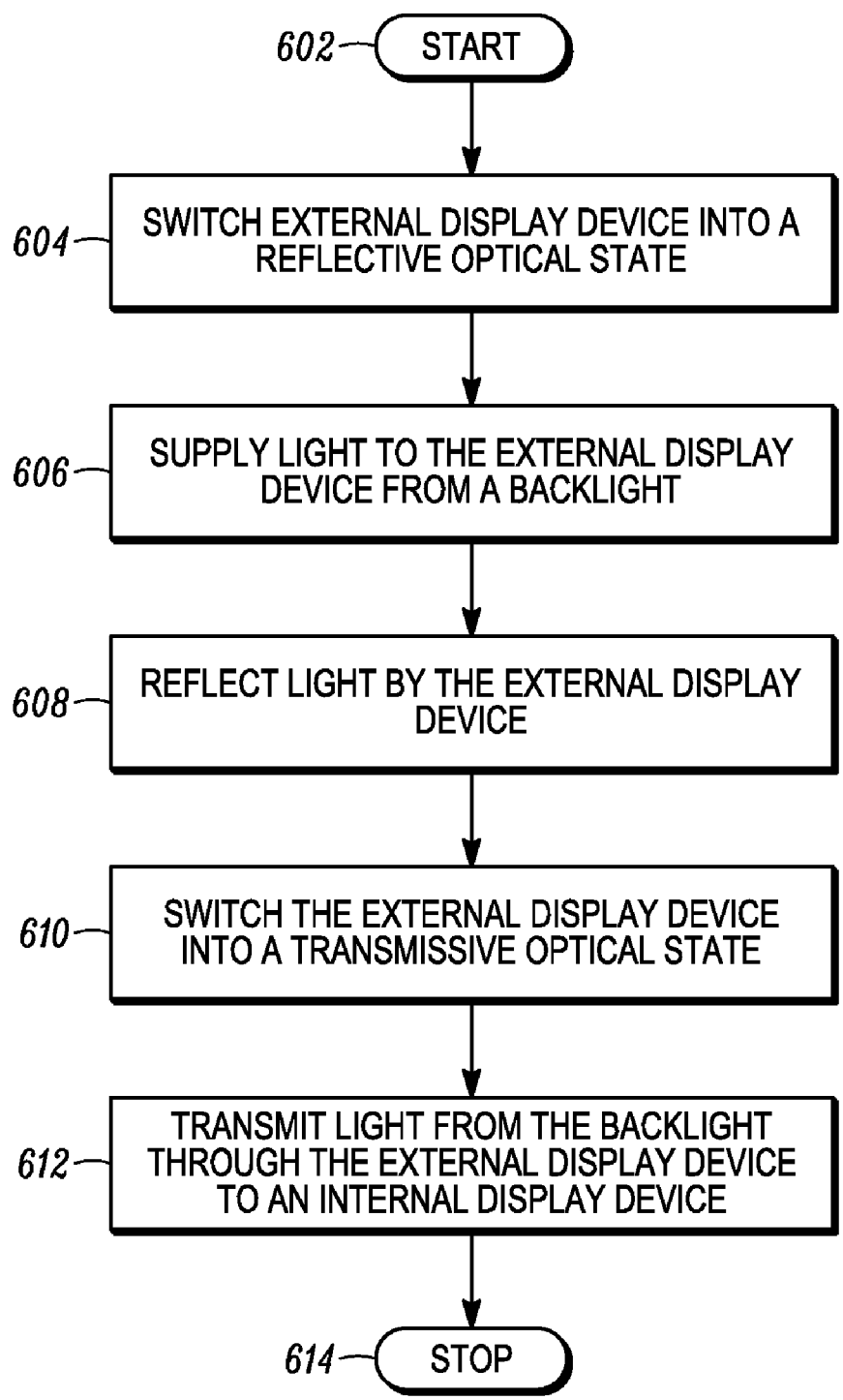
FIG. 6 is a flow chart illustrating a method of operation of a display in a mobile electronic device having an internal display device and an external display device, in accordance with various embodiments.

FIG. 6 is a flow chart illustrating a method of operation of a display in a mobile electronic device as has been herein disclosed. Thus, in 602 a sensing and control circuitry of the mobile electronic device 100 determines that the mobile electronic device 100 is in the closed position.

In 604, in response to determining that the electronic mobile device 100 is in the closed position, the external display device 110 is switched ON and also into a reflective optical state. In 506, light is supplied to the external display device 110 from the backlight 108. The backlight 108 receives the light from the light source 112 or in some embodiments from ambient light as was discussed above.

In 608, light is reflected by the external display device 110 and visual information is provided. In 610, the external display device 110 is switched OFF and to a transmissive optical state in response to determining that the mobile electronic device 100 is in an open position. In 612, light is transmitted from the backlight device 108, through the external display device 110, to illuminate the internal display device 106. Thus, visual information is provided by the internal display device 106. The method is terminated as shown in 614 when the mobile electronic device is powered OFF. Otherwise, if the mobile electronic device is again closed, the method returns to 602 and repeats as necessary. Also, when the mobile electronic device 100 is initially powered on, the sensing and control circuitry will determine whether it is in the open or closed position and the method will begin at either 604 or 610 as appropriate.

While the preferred embodiments have been illustrated and described, it is to be understood that the embodiments are not so limited. Numerous modifications, changes, variations, substitutions and equivalents will occur to those skilled in the art without departing from the spirit and scope as defined by the appended claims.

What is claimed is:

1. A display stack-up comprising:
   an internal display device;
   a backlight unit being capable of providing illumination to the internal display device; and
   an external display device having bi-stable optical states, said states including a transmissive optical state and a reflective optical state, wherein the external display device is placed between the backlight unit and the internal display device.

2. The display stack-up of claim 1, wherein the external display device is a cholesteric display.

3. The display stack-up of claim 2, wherein said external display device in said transmissive optical state allows transmission of light from said backlight unit through said external display device to said internal display device, and wherein said external display device in said reflective optical state reflects light from said backlight back through said backlight and away from said internal display device.

4. The display stack-up of claim 3, wherein said external display device in said transmissive optical state has an optical diffusion property.

5. The display stack-up of claim 1, wherein the internal display device provides a contrast backplane for said external display device when said internal display device is powered off.

6. A mobile electronic device comprising:
   an internal display device;
   a backlight unit being capable of providing illumination to the internal display device;
   an external display device having a bi-stable optical property, said external display device positioned between said backlight unit and said internal display device; and
   a control component coupled to said internal display device, said external display device, and said backlight.

7. The mobile electronic device of claim 6, further comprising:
   a first housing member having a internal surface and an external surface, said first housing member containing said internal display device, said external display device and said backlight; and a second housing member hingedly connected to said first housing member, said first and said second housing members configurable in opened and closed positions, wherein at least a portion of said internal surface is in contact with said second housing member when said first housing member and said second housing member are configured in said closed position.

8. The mobile electronic device of claim 7, wherein said internal display device is substantially in parallel with, and visible through, said internal surface and wherein said external display device is substantially in parallel with, and visible through, said external surface.

9. The mobile electronic device of claim 8, further comprising a light source coupled to said backlight.

10. The mobile electronic device of claim 8, wherein the external display device is a cholesteric display.

11. The mobile electronic device of claim 8, wherein the internal display device is a high resolution color active matrix display.

12. The mobile electronic device of claim 8, wherein the control component is configured to:
 determine that said first housing member and said second housing member are configured in said closed position;
 switch said external display device into a reflective optical state; and
 switch said internal display device off.

13. The mobile electronic device of claim 8, wherein the said control component is configured to:
 determine that said first housing member and said second housing member are configured in said open position;
 switch said external display device into a transmissive optical state; and
 switch said internal display device on.

14. The mobile electronic device of claim 12, wherein said external display device in said reflective optical state reflects light from said backlight through said external surface.

15. The mobile electronic device of claim 13, wherein said external display device in said transmissive optical state allows transmission of light from said backlight through said external display device to said internal display device.

16. The mobile electronic device of claim 12, wherein said internal display device is in a fixed color optical state when off, said fixed color optical state providing a contrast background for said external display device.

* * * * *